(12) United States Patent
Lee et al.

(10) Patent No.: US 7,376,781 B2
(45) Date of Patent: *May 20, 2008

(54) VIRTUAL USB CARD READER WITH PCI EXPRESS INTERFACE

(75) Inventors: Kian-Leng Lee, Hsinchu (TW); Wee-Kuan Gan, Hsinchu (TW)

(73) Assignee: Phison Electronics Corp., Hsinchu Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/747,240

(22) Filed: May 11, 2007

(65) Prior Publication Data

US 2007/0288681 A1    Dec. 13, 2007

Related U.S. Application Data

(63) Continuation of application No. 10/906,938, filed on Mar. 14, 2005, now Pat. No. 7,222,212.

(51) Int. Cl.
*G06F 13/00* (2006.01)

(52) U.S. Cl. ....................... 710/315; 711/115

(58) Field of Classification Search ................ 710/313, 710/315; 711/115
See application file for complete search history.

(56) References Cited

U.S. PATENT DOCUMENTS

| | | | |
|---|---|---|---|
| 6,292,863 B1* | 9/2001 | Terasaki et al. | 710/313 |
| 7,222,212 B2* | 5/2007 | Lee et al. | 710/315 |
| 7,225,289 B2* | 5/2007 | Tee et al. | 710/315 |
| 2005/0055481 A1* | 3/2005 | Chou et al. | 710/52 |
| 2005/0120146 A1* | 6/2005 | Chen et al. | 710/22 |
| 2005/0160218 A1* | 7/2005 | See et al. | 711/103 |
| 2006/0047880 A1* | 3/2006 | Lindblom et al. | 710/305 |
| 2006/0149860 A1* | 7/2006 | Diamant | 710/15 |
| 2006/0168387 A1* | 7/2006 | Gan et al. | 710/305 |
| 2006/0168391 A1* | 7/2006 | Gan et al. | 711/103 |

* cited by examiner

*Primary Examiner*—Glenn A. Auve
(74) *Attorney, Agent, or Firm*—Jianq Chyun IP Office

(57) ABSTRACT

The present invention discloses a virtual universal serial bus (USB) card reader with a peripheral component interconnect (PCI) Express interface. The card reader includes a microcontroller connected to a PCI Express connecting interface and a memory card connecting interface separately. The microcontroller includes a memory card interface, a PCI Express interface and a virtual USB module. The virtual USB module includes a USB host and a USB device. If a host gives an instruction to a memory card connected to the card reader for storing or reading data, the instruction will be sent to and executed by the virtual USB module. The data in the memory card can be transmitted at a transmission rate up to the USB standard, and the host will consider the card reader as a USB device instead of simply a PCI Express device.

22 Claims, 2 Drawing Sheets

VIRTUAL USB CARD READER WITH PCI EXPRESS INTERFACE

CROSS-REFERENCE TO RELATED APPLICATION

This application is a continuation application of patent application Ser. No. 10/906,938, filed on Mar. 14, 2005 and now allowed. The entirety of the above-mentioned patent application is hereby incorporated by reference herein and made a part of this specification.

BACKGROUND OF THE INVENTION

1. Field of Invention

The present invention relates to a virtual universal serial bus (USB) card reader with a peripheral component interconnect (PCI) Express interface, and more particularly to a virtual USB card reader that uses the PCI Express interface as a transmission interface.

2. Description of Related Art

As the science and technology of computers grows in a fast changing manner, a computer tends to be developed with powerful computational functions and a fast speed, and thus the clock of a central processing unit (CPU) is too fast, and the transmission rate of other peripheral equipments cannot catch up with the processing speed of the CPU at all. Even though the CPU continues enhancing its performance, the transmission rate of peripheral equipments cannot be improved much because the overall performance of a computer depends on the whole system. It is necessary to improve the whole computer architecture before the performance of a CPU can be maximized.

However, the data transmission rate depends on the transmission rate of a bus. To enhance the performance of a computer, related manufacturers usually improve the transmission rate of a bus. For example, the transmission rate of an integrated drive electronic (IDE) interface connected to a hard disk drive reaches 160 MB/s; the network line is upgraded from 10 MB/s to 1 GB/s; the transmission rate of the RS-232 is replaced by the 480 Mb/s of the universal serial bus (USB), and the present PCI interface with a transmission rate of 133 MB/s upgrades the transmission rate of its lane to 250 MB/s, which becomes a new-generation peripheral component interconnect (PCI) Express interface. The PCI Express interface further supports a hot-plug control function. Therefore, the PCI Express interface is extensively accepted by users.

Further, the flash memory since its announcement gradually replaces the EEPROM or battery power memory in many portable device due to its charming features including low power consumption, non-volatility, shock resistance, and high-capacity storage. With the advanced semiconductor technologies, the storage capacity and transmission rate of a flash memory grow rapidly and the flash memory replaces traditional storage medium such as a hard disk drive in many applications. However, the present memory card made of flash memories becomes an indispensable product to the general public and the sales volume and types of memory cards are growing due to the popularity of digital cameras, PDAs, and mobile phones.

Most memory cards use a universal serial bus (USB) interface or an integrated drive electronics (IDE) interface as the transmission interface. The transmission rates of the USB or IDE interface are just 480 Mb/s and 160 MB/s respectively, and such transmission rates cannot catch up with the accessing speed of the memory card. Therefore, the applications of the memories are restricted by the USB or IDE interface of the host, and its performance cannot be maximized.

Further, several environment interfaces that integrate editing, coding, debugging, file management and execution are provided in a program development system or a software program, and such environment interface enables a programmer to execute and develop most of the work required for an application program. Therefore, the software executed at the host adopts a specific environment interface and peripheral device for communications, and the peripheral devices must have the environment interface of the host before the instruction from the host can be executed.

Therefore, it is desirable to provide a card reader that eliminates the aforesaid drawbacks.

SUMMARY OF THE INVENTION

The present invention has been accomplished under the circumstances in view. Therefore, it is a primary objective of the present invention to use the PCI Express interface as a transmission interface between a host and a card reader, and the card reader has a USB module capable of communicating with the host, such that the card reader can achieve its maximum transmission rate when accessing data in a memory card through the card reader, and the card reader also has the features of a USB interface.

To achieve the foregoing objective, the card reader comprises memory card reader. The memory card reader includes a microcontroller a memory card connecting interface a PCI Express connecting interface. The microcontroller has a memory card interface, a PCI Express interface, and a virtual USB module. The virtual USB module includes a virtual USB host for receiving a USB instruction given by a host and a virtual USB device for executing the USB instruction. The virtual USB module is implemented by firmware program to be executed by the microcontroller. The memory card connecting interface is coupled to the microcontroller and provided for connecting to an external memory card. The PCI Express connecting interface being is coupled to a PCI Express bus disposed between the host and the memory card reader. When the memory card reader is coupled to the host, the microcontroller of the memory card reader notifies the host that the memory card reader is a USB host. When the host reads data stored in the memory card is connected to the memory card connecting interface, the USB instruction from the host is sent to the virtual USB module to be executed by the virtual USB module, and the data in the memory card coupled to the memory card connecting interface is converted by the memory card interface or the PCI Express interface into a data format acceptable by the PCI Express bus, and then the data is sent to the host.

In an embodiment, the invention provides a memory card reader. The memory card reader includes a microcontroller, and the microcontroller is connected separately to a PCI Express connecting interface for connecting a PCI Express bus built in a host and a memory card connecting interface for connecting a memory card, and the microcontroller has a memory card interface, a PCI Express interface and a virtual USB module, such that if the host gives an instruction to a memory card connected to a card reader for storing or reading data, the instruction will be sent to the virtual USB module and the execution of the instruction will be completed by the virtual USB module. The data in the memory card connected to the card reader is processed according to the instruction, and the memory card interface or the PCI Express interface built in the microcontroller converts the data into a data format acceptable to the memory card or the PCI Express bus. The data is then sent to the host or the memory card, such that the host can give instruction to the card reader through the virtual USB module for accessing data, and the data transmission rate can meet the transmission rate of the PCI Express standard and the card reader can maximize its transmission rate without losing the features of a USB interface.

The present invention has been accomplished under the circumstances in view. Therefore, it is a primary objective of the present invention to use the PCI Express as a transmission interface between a host and a card reader, and the card reader has a USB module capable of communicating with the host, such that the card reader can achieve its maximum transmission rate when accessing data in a memory card through the card reader, and the card reader also has the features of a USB interface.

To achieve the foregoing objective, the card reader comprises a microcontroller, and the microcontroller is connected separately to a PCI Express connecting interface for connecting a PCI Express built in a host and a memory card connecting interface for connecting a memory card, and the microcontroller has a memory card interface, a PCI Express interface and a virtual USB module, such that if the host gives an instruction to a memory card connected to a card reader for storing or reading data, the instruction will be sent to the virtual USB module and the execution of the instruction will be completed by the virtual USB module. The data in the memory card connected to the card reader is processed according to the instruction, and the memory card interface or the PCI Express interface built in the microcontroller converts the data into a data format acceptable to the memory card or the PCI Express. The data is then sent to the host or the memory card, such that the host can give instruction to the card reader through the virtual USB module for accessing data, and the data transmission rate can meet the transmission rate of the PCI Express standard and the card reader can maximize its transmission rate without losing the features of a USB interface.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
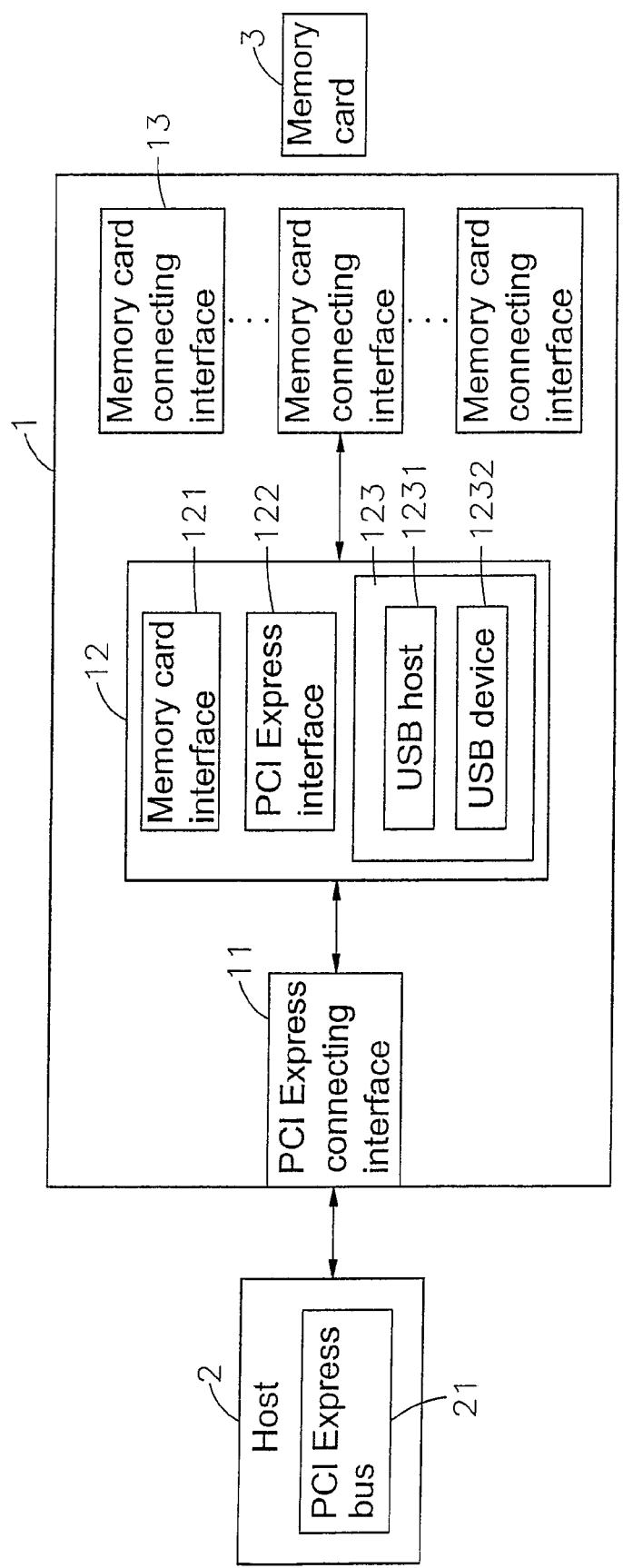
FIG. 1 is a block diagram according to a preferred embodiment of the present invention.

In FIG. 1, a card reader 1 of the present invention comprises a PCI Express connecting interface 11, a microcontroller 12 and a memory card connecting interface 13.

The PCI Express connecting interface 11 is provided for connecting to a PCI Express bus 21 built in a host 2.

The microcontroller 12 includes a memory card interface 121, a PCI Express interface 122 and a virtual USB module 123, and the virtual USB module 123 includes an USB host 1231 and an USB device 1232, and the microcontroller 12 is connected to the PCI Express connecting interface 11, and the virtual USB module 123 is not physical object, but it is virtual and simulated by a designer's firmware program.

The memory card connecting interface 13 is connected to the microcontroller 12, and the memory card connecting interface 13 is provided for connecting a memory card 3.

When the PCI Express connecting interface 11 built in the card reader 1 is connected to the PCI Express bus 21 built in the host 2, the microcontroller 12 of the card reader 1 will declare to the host 2 that the card reader 1 is a USB host, such that the host 2 will consider the microcontroller 12 as a USB host, even though the host 2 remains communicating with the microcontroller 12 by the PCI Express architecture. When the memory card 3 is connected to the memory card connecting interface 13 and the host 2 gives an instruction to the memory card 3 for storing data, the instruction will be sent to the USB host 1231 installed in the virtual USB module 123 of the microcontroller 12 first, and the USB host 1231 will sent the instruction to a USB device 1232, and the USB device 1232 will complete the execution of the instruction. At that time, the data of the host 2 will be sent to the mircocontroller 12 through the PCI Express bus 21 and the PCI Express connecting interface 11, and the memory card interface 121 built in the microcontroller 12 will convert the data into a data format acceptable by the memory card 3, and the data will be stored in the memory card 3.

Further, when the host 2 wants to read a data stored in the memory card 3, an USB instruction will be sent to the USB host 1231 built in the virtual USB module 123 of the microcontroller 12 first, and then the USB host 1231 will sent the instruction to an USB device 1232, and the USB device 1232 will complete the execution of the instruction. At that time, the memory card 3 will send the data to the microcontroller 12, and the PCI Express interface 122 built in the microcontroller 12 will convert the data into a data format acceptable by the PCI Express bus 21, and then the data will be sent to the host 2 through the PCI Express connecting interface 11 and the PCI Express bus 21.

From the description above, when the host 2 reads or stores data of the memory card 3, the data is read from or written into the memory card 3 through the microcontroller 12, and the read or write instruction is executed and completed by the USB host 1231 and the USB device 1232 built in the virtual USB module 123. Therefore, the host 2 considers the card reader 1 as an USB host with PCI Express interface.

Further, the memory card interface 121 could be a CF memory card interface, a MS memory card interface, an XD memory card interface, a SM memory card interface, a MMC memory card interface or a SD memory card interface.

Further, the quality of memory card connecting interface 13 could be one or more.

Figure 2:
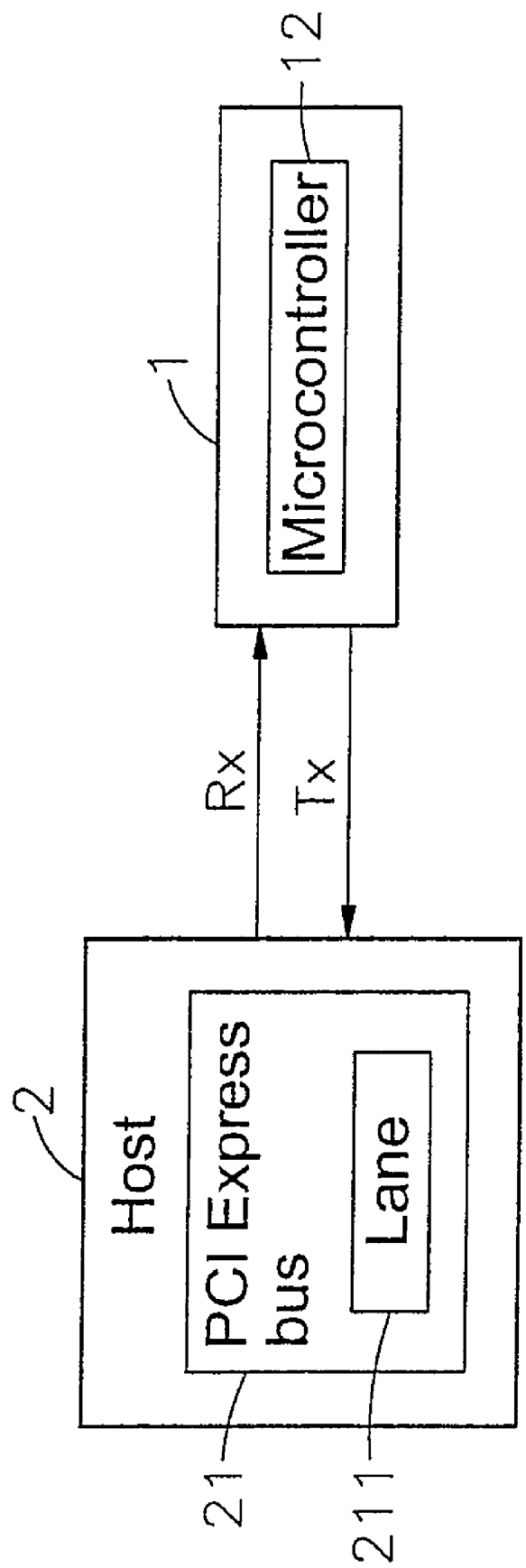
FIG. 2 is a schematic view of transmitting data according to a preferred embodiment of the present invention.

In FIG. 2, the host 2 and the card reader 1 has a lane 211 at a physical layer for transmitting data, and the lane 211 is comprised of a transmitting end (Tx) and a receiving end (Rx), and the quantity of the lane 211 could be one or more.

Therefore, the key for the virtual USB card reader with PCI Express interface in accordance with the present invention to improve the prior arts resides on that the present invention uses a USB host and a USB device built in the card reader to execute the instruction given by the host and also uses a PCI Express interface as the transmission interface between the host and the card reader, such that the data can be transmitted at a transmission rate that can meet the PCI Express standard, and the card reader maximize its transmission rate.

A prototype of virtual USB card reader with PCI Express interface has been constructed with the features of FIGS. 1~2. The virtual USB card reader with PCI Express interface functions smoothly to provide all of the features discussed earlier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory card reader, comprising:
    a microcontroller, having a memory card interface, a PCI Express interface, and a virtual USB module, and the virtual USB module comprising a virtual USB host for receiving a USB instruction given by a host and a virtual USB device for executing the USB instruction, the virtual USB module being implemented by firmware program to be executed by the microcontroller;
    a memory card connecting interface coupled to the microcontroller and provided for connecting to an external memory card; and
    a PCI Express connecting interface being coupled to a PCI Express bus disposed between the host and the memory card reader,
    wherein when the memory card reader is coupled to the host, the microcontroller of the memory card reader notifies the host that the memory card reader is a USB host, and
    wherein when the host reads data stored in the memory card connected to the memory card connecting interface, the USB instruction from the host is sent to the virtual USB module to be executed by the virtual USB module, and the data in the memory card coupled to the memory card connecting interface is converted by the memory card interface or the PCI Express interface into a data format acceptable by the PCI Express bus, and then the data is sent to the host.

2. The memory card reader as claimed in claim 1, wherein the host and the memory card reader have only one lane at a physical layer for transmitting data, and the lane comprises a transmitting end (Tx) and a receiving end (Rx).

3. The memory card reader as claimed in claim 1, wherein the host and the memory card reader have more than one lane at a physical layer for transmitting data, and the lanes comprise a transmitting end (Tx) and a receiving end (Rx).

4. The memory card reader as claimed in claim 1, wherein the memory card connecting interface comprises a plurality of memory card connecting interfaces.

5. The memory card reader as claimed in claim 1, wherein the memory card interface is a CF memory card interface.

6. The memory card reader as claimed in claim 1, wherein the memory card interface is a MS memory card interface.

7. The memory card reader as claimed in claim 1, wherein the memory card interface is a XD memory card interface.

8. The memory card reader as claimed in claim 1, wherein the memory card interface is a SM memory card.

9. The memory card reader as claimed in claim 1, wherein the memory card interface is a SD memory card interface.

10. The memory card reader as claimed in claim 1, wherein the memory card interface is a MMC memory card interface.

11. The memory card reader as claimed in claim 1, wherein the virtual USB module is not a physical object, but a virtual object created by a designer through a firmware program.

12. A memory card reader, comprising:
    a microcontroller, having a memory card interface, a PCI Express interface, and a virtual USB module for receiving and execution a USB instruction given by a host, the virtual USB module being implemented by firmware program to be executed by the microcontroller;
    a memory card connecting interface coupled to the microcontroller and provided for connecting to an external memory card; and
    a PCI Express connecting interface being coupled to a PCI Express bus disposed between the host and the memory card reader,
    wherein when the memory card reader is coupled to the host, the microcontroller of the memory card reader notifies the host that the memory card reader is a USB host, and
    wherein when the host reads data stored in the memory card connected to the memory card connecting interface, the USB instruction from the host is sent to the virtual USB module and to be executed by the virtual USB module, and the data in the memory card coupled to the memory card connecting interface is converted by the memory card interface or the PCI Express interface into a data format acceptable by the PCI Express bus, and then the data is sent to the host.

13. The memory card reader as claimed in claim 12, wherein the host and the memory card reader have only one lane at a physical layer for transmitting data, and the lane comprises a transmitting end (Tx) and a receiving end (Rx).

14. The memory card reader as claimed in claim 12, wherein the host and the memory card reader have more than one lane at a physical layer for transmitting data, and the lanes comprise a transmitting end (Tx) and a receiving end (Rx).

15. The memory card reader as claimed in claim 12, wherein the memory card connecting interface comprises a plurality of memory card connecting interfaces.

16. The memory card reader as claimed in claim 12, wherein the memory card interface is a CF memory card interface.

17. The memory card reader as claimed in claim 12, wherein the memory card interface is a MS memory card interface.

18. The memory card reader as claimed in claim 12, wherein the memory card interface is a XD memory card interface.

19. The memory card reader as claimed in claim 12, wherein the memory card interface is a SM memory card.

20. The memory card reader as claimed in claim 12, wherein the memory card interface is a SD memory card interface.

21. The memory card reader as claimed in claim 12, wherein the memory card interface is a MMC memory card interface.

22. The memory card reader as claimed in claim 12, wherein the virtual USB module is not a physical object, but a virtual object created by a designer through a firmware program.

* * * * *